(12) United States Patent
Lau et al.

(10) Patent No.: US 7,691,768 B2
(45) Date of Patent: Apr. 6, 2010

(54) ADDITIVE TO MAXIMIZE GLP AND PROPENE SUITABLE FOR USE IN LOW-SEVERITY OPERATIONS OF A FLUID CATALYTIC CRACKING UNIT AND ITS PREPARATORY PROCESS

(75) Inventors: Lam Yiu Lau, Rio de Janeiro (BR); Raquel Bastiani, Rio de Janeiro (BR); Claudia Maria de Lacerda Alvarenga Baptista, Rio de Janeiro (BR)

(73) Assignee: Petroleo Basileiro S.A. - Petrobras, Rio De Janeiro (BR)

( * ) Notice: Subject to any disclaimer, the term of this patent is extended or adjusted under 35 U.S.C. 154(b) by 1 day.

(21) Appl. No.: 11/714,117

(22) Filed: Mar. 6, 2007

(65) Prior Publication Data

US 2008/0015105 A1      Jan. 17, 2008

(30) Foreign Application Priority Data

Jul. 14, 2006    (BR)    .................................... 0602678

(51) Int. Cl.
*B01J 29/06*    (2006.01)
(52) U.S. Cl. .......................................... 502/73; 502/77
(58) Field of Classification Search .................. 502/73, 502/77
See application file for complete search history.

(56) References Cited

U.S. PATENT DOCUMENTS

| | | | | | |
|---|---|---|---|---|---|
| 4,368,114 | A | * | 1/1983 | Chester et al. | ......... 208/120.05 |
| 5,179,054 | A | * | 1/1993 | Schipper et al. | ................ 502/67 |
| 5,380,690 | A | | 1/1995 | Zhicheng et al. | |
| 2004/0152585 | A1 | * | 8/2004 | Ou et al. | ....................... 502/64 |
| 2005/0227853 | A1 | * | 10/2005 | Kumar | ......................... 502/64 |
| 2007/0095724 | A1 | | 5/2007 | Baptista et al. | |

OTHER PUBLICATIONS

Peterman et al; "Distillate yield from the FCC: Process and catalyst changes for maximization of LCO"; Catalysts Carrier; Apr. 1998; pp. 1, 6-10.
Donnelly et al; "How ZSM-5 Works in FCC"; Symposium on Advances in FCC Presented Before the Division of Petroleum Chemistry, Inc., American Chemical Society New Orleans Meeting, Aug. 30-Sep. 4, 1987 pp. 621-626.
Hollander et al; "Gasoline conversion: reactivity towards cracking with equilibrated FCC and ZSM-5 catalysts"; Applied Catalysis A: General 223; 2002; pp. 85-102.
Wakui et al; "Dehydrogenative cracking of *n*-butane using double-stage reaction"; Applied Catalysis A: General 230; 2002; pp. 195-202.
Yokoyama et al; "Selective reduction of nitrogen monoxide by propene over cerium-doped zeolites"; Applied Catalysis Today 22; 1994; pp. 59-72.
Krishna et al; "Additives improve FCC process"; Hydrocarbon Processing, Nov. 1991 pp. 59-66.
Hydrocarbon Publishing Company; "Advanced Hydrotreating and Hydrocracking Technologies to Product Ultra$^2$-Clean Diesel Fuel"; 2004; 3 pages.
Degnan et al; "History of ZSM-5 fluid catalytic cracking additive development at Mobile"; Microporous and Mesoporous Materials; 2000; pp. 245-252.
Pohlenz; "New development boosts production of middle distillate from FCC"; The Oil and Gas Journal; Aug. 1970; pp. 158-165.
Zhang et al; "Studies on Maximizing Diesel Oil Production from FCC"; Fifth International Symposium on the Advances of Fluid Catalytic Cracking Presented Before the Division of Petroleum Chemistry, Inc. 218$^{TH}$ National Meeting, American Chemical Society; New Orleans, LA, Aug. 22-26, 1999; pp. 457-459.

* cited by examiner

*Primary Examiner*—Elizabeth D Wood
(74) *Attorney, Agent, or Firm*—Nixon & Vanderhye P.C.

(57) ABSTRACT

A process for the preparation and modification of additives, with a zeolite base and a high silica alumina ratio (SAR) like the ZSM-5, to increase the yield of propene and LPG in low severity FCC operations, that seeks to maximize the production of medium-distillates with low aromaticity and to minimize molecular cracking in the LCO range. The additives involved guarantee an increase in light olefin yields without altering the yield or the quality of the LCO produced. The innovative process includes surprising actions from rare earths (RE) on the active sites of zeolite, that at once partially block their pores and, in this way, make molecular cracking in the medium-distillate range difficult, which preferably occur at low reaction temperatures and keeps the remaining sites quite active. These sites are sufficiently active to crack smaller molecules in the gasoline range, guaranteeing an overall increase in light olefins and allowing the additive involved to be used industrially in operations to maximize medium-distillates in an FCC unit. This new additive may be obtained by modifying any commercial ZSM-5 zeolite additive.

10 Claims, No Drawings

ADDITIVE TO MAXIMIZE GLP AND PROPENE SUITABLE FOR USE IN LOW-SEVERITY OPERATIONS OF A FLUID CATALYTIC CRACKING UNIT AND ITS PREPARATORY PROCESS

CROSS REFERENCE TO RELATED APPLICATION

This application is based upon, claims the benefit of, priority of, and incorporates by reference, the contents of Brazilian Patent Application No. PI 0602678-8 filed Jul. 14, 2006.

BACKGROUND OF THE INVENTION

1. Field of the Invention

The present invention refers to a process for the preparation and modification of additives, based on zeolite with a high silica-alumina ratio (SAR), such as ZSM-5 (Zeolite Socony Mobile In. 5) capable of increasing the production of LPG and of propene in low-severity operations in fluid catalytic cracking (FCC) units, in order to maximize the production of medium-distillate fractions with low aromaticity.

The present invention provides a method for obtaining modified additives, which minimizes molecular cracking in an LCO range and makes an increase in gasoline octane possible in low-severity operations.

2. Description of the Related Art

Fluid catalytic cracking (FCC) is performed by the contact of hydrocarbons with a fine particulate matter catalyst in a pipe reaction zone or riser. Loads that are commonly submitted to FCC processing are, usually, petroleum refinery process streams that come from longitudinally segmented vacuum towers, called heavy Vacuum Gas Oil (VGO), or chains that are heavier than before coming from the bottom of atmospheric towers, called Atmospheric Residue (AR), or even mixtures of these two streams. Typically, these streams, have a density in the range of 8 to 28 o API, and must be chemically processed using a process such as the catalytic cracking process, which fundamentally alters its chemical composition, converting them into lighter, and more valuable hydrocarbon streams.

From the time of its initial conception, the FCC process has been a process essentially aimed at the production of high octane gasoline, and is also responsible for the production of LPG. The medium distillates (LCO) produced by this process represent between 15% and 25% of the total yield and correspond to a distillation range that typically goes from 200° C. and 340° C. Normally, LCOs have a high concentration of aromatics, which may surpass 80% of the total composition, a fact that makes it difficult to incorporate into the diesel pool. The current and future scenario points to a slow down in the consumption of gasoline and an increase in diesel oil. With the increase in the demand for high quality medium-distillates to the detriment of the gasoline market in mind, changes in the mode of operation of FCC units have been discussed, for the purpose of increasing medium-distillate production in FCC processing. Nevertheless, the high concentration of aromatics in LCO is responsible for its high density and its abysmal explosive quality in diesel motors (low cetane number). The high level of aromatics also makes it difficult for hydrotreatment processing to improve their properties for this purpose.

For the purpose of increasing the yield of medium-distillates and at the same time reduce the level of aromatics; several works discuss modifications in the catalytic system and in the operational fluctuations in order to attain a reduction in the severity of the process. Among the operational conditions a reduction in the reaction temperature and a reduction to the catalyst-to-oil ratio (CTO) are included. The form of operation most commonly used to maximize medium-distillates in the FCC process use a reduced reaction temperature at extremely low numbers (between 450° C. and 500° C.), low activity catalyst, and minimized catalyst circulation. All these measures achieve an increase in the yield and improve the quality (by a reduction of aromatics) of the LCO produced. On the other hand, they reduce the conversion with a subsequent reduction in the production of LPG and propene, which in turn reduces the octane of the gasoline. Some important references on this issue are listed below: 1) *Distillate yield from the FCC: process and catalyst changes for maximization of LCO:* Catalysts Courier, R. W. Peterman; 2) Hydrocarbon Publishing Company: *Advanced hydrotreating and hydrocarbon technology to produce ultra2-clean diesel fuel,* 2004; 3) *Studies on maximizing diesel oil production from FCC:* Fifth international symposium on the advances in fluid catalytic cracking, (218th National meeting, American Chemical society, 1999); 4) *New development boosts production of middle distillate from FCC:* Oil and Gas Journal (August, 1970).

The industrial application of additives, based on zeolite with a high silica-alumina ratio (SAR), such as ZSM-5 (Zeolite Socony Mobile), began in 1983. Since then, ZSM-5 has been used with great success in FCC processing as an active component of the additives, to increase yield in light hydrocarbons, such as liquefied petroleum gas (LPG) and light olefins of high aggregate value, such as propene and isobutene.

It has also been observed that the use of this additive promotes an increase in octane in gasoline, accompanied with a reduction in the yield of that fraction. The literature relative to this issue may be verified in the publications: 1) F. Degnan, G. K. Chitnis, P. H. Schipper, *History of ZSM-5 fluid cracking additive development at Mobil,* Microporous and Mesoporous Materials, 35-36 (2000) 245-252; 2) S. P. Donnelly, S. Mizzahi, P. T, Sparrel, A. Huss, Jr., P. H. Schipper and J. A. Herbst, *How ZSM-5 works in FCC,* Division of Petroleum Chemistry, ACS Meeting, Aug. 30-Sep. 4, New Orleans, 1987; 3) A. S. Kishna, C. R. Hsieh, A. R. English, T. A. Picoraro, C. W. Kuehler, *Additives improve CFC process,* Hydrocarbon Processing, November (1991) 59-66. Notwithstanding, it uses a reaction temperature on the order of 540° C. to maximize gasoline. Under these conditions, practically no change is seen in the yield or the quality of LCO.

Studies carried out in the Petrobras Research Center have proven that the use of ZSM-5 additives in catalytic cracking processing that operate at low severity by reducing the reaction temperature, promote a reduction in LCO yield and an increase in aromatics. Thus, the presence of this commercial additive in FCC operations to maximize medium-distillates becomes harmful, since its effects are contrary to the main objective of the operation.

The present invention proposes the alternative of using ZSM-5 in soft fluid catalytic cracking (MFCC), in other words, in typical low severity fluid catalytic cracking operations. Using this innovative method this additive is modified by the depositing rare earths, in order to promote a partial blockage of the zeolite pores, making the molecular cracking difficult in the LCO range and, in turn, keeping the remaining sites active or sufficient to perform cracking of smaller molecules, in the gasoline range, guaranteeing an overall increase in light olefins.

In the specialized literature, the use of zeolite ZSM-5 is widely cited as being used in conjunction with rare earths in various applications, such as in the production of light olefins, the reclamation of CO2/CH4 to obtain synthesis gas, n-butane dehydrogenation and cracking, catalytic reduction of NOx by propene and aromatization of C6-olefin flows to BTX (benzene, toluene, and xilenes). The use of rare-earth-exchanged ultrastable Y (REUSY) zeolite is also cited in FCC to promote a greater catalytic tolerance to vanadium and to increase gasoline yield in detriment to gas yield. The use of rare-earth-exchanged ultrastable Y (REUSY) zeolite in FCC catalysts has the objective of improving the FCC catalyst's stability when in the presence of vanadium and to increase gasoline yield in detriment to gas yield. An increase in the level of rare-earth-exchanged Y zeolite promotes transfer reactions of hydrogen in the FCC process, resulting in an increase in the formation of aromatic compounds through dehydrogenation reactions of naphthenic compounds. However, this effect is contrary to the desired effect for these applications of this invention. The literature relative to the use of the exchanged rare earth in ZSM-5, may be verified in the written publications described below: 1) Zhicheng, S. et al. U.S. Pat. No. 5,380,690; 2) Zhang, W. D., et al. *Preparation of La2NiO4/ZSM-5 catalyst and catalytic performance m CO2/CH4 reforming to Syngas*. Applied Catalysis A: General, v. 223, p. 85-102, 2002; 3) Wakui, K. et al. *Dehydrogenative cracking of n-butane using double-stage reaction*. Applied Catalysis A: General, v. 230, p. 195-202, 2002; 4) Yokoyama, C. and Misono, M. *Selective reduction of nitrogen monoxide by propene over cerium-doped zeolites*. Catalysis Today, v. 22, n. 1, p. 59-72, 1994.

The China Petro-Chemicals Corporation possesses a patent citing the formula for a Pentasil type zeolite catalyst, modified with phosphorus and rare earths, for the production of light olefins.

The catalyst consists of a mixture of zeolite (1-50% p/p), kaolin (0-70%) and inorganic oxides (5-99% p/p). The zeolite mixture consists of rare earth exchanged zeolite Y (REY), the concentration of which ranges between 0 and 25% p/p, and between 75 and 100% p/p of a Pentasil type zeolite containing phosphorus and rare earths. However, this patent seeks to improve the catalyst activity in typical FCC processing conditions and, therefore, it does not take into account the amount nor the quality of the LCO fraction.

Wakui et al. studied pure ZSM-5 cracking of n-butane for high conversions. The authors observed that with rare earth exchanged ZSM-5 zeolites more ethene is formed in detriment to the formation of aromatic compounds. They discuss the fact that rare earths in ZSM-5 favor monomolecular cracking reactions in detriment to bimolecular reactions such as, for example, the transfer of hydrogen. Thus, this type of application seeks to crack compounds with low molecular weight, in conditions that are much more drastic than the conditions which apply to the present invention.

SUMMARY OF THE INVENTION

Obtaining an additive appropriate for maximization of medium-distillates by depositing rare earths in precursor additives containing ZSM-5 type zeolites. The new additive thusly obtained favors a concentration of saturated distillates in the LCO range.

The present invention allows a low severity FCC operation, aimed at producing medium-distillates, while maintaining LPG and propene yield in a conventional FCC operation that normally targets a maximum gasoline yield. The use of ZSM-5 type zeolite additives is fundamental for the production of medium-distillates (LCO). ZSM-5 additives improve gasoline octane while maintaining the LPG and propene yield, which would be substantially reduced in the absence of these additives in low severity operations.

When conventional additives are used in low severity FCC operations, lighter compound cracking at low reaction temperatures reduces the yield and the quality of LCO. The use of the additive prepared by the method of the present invention minimizes the reduction of the yield and quality of LCO.

No publication of open literature describes or suggests a process to modify ZSM-5 zeolite, based on rare earth precipitation, for the purpose of reducing the catalytic cracking of molecules in the LCO range, at low reaction temperatures, while maintaining the commitment to increase the LPG and propene yield.

Furthermore, no publication or patent filed has referenced any process for the preparation or modification of additives containing ZSM-5 zeolite, for the purpose of adapting it to a low severity FCC unit. The present invention offers a method to improve the activity of ZSM-5 additives, so that it will favor the production of LPG and propene in operations with low reaction temperatures, minimizing LCO range hydrocarbon cracking. To achieve this objective a methodology is described for the precipitation of rare earths in ZSM-5 zeolite.

DETAILED DESCRIPTION OF THE INVENTION

The present invention explains a process for the production of a new additive for FCC catalysts that consists of a method for modifying ZSM-5 zeolite. The innovative process includes the precipitation of rare earths (RE) into active sites on zeolite, for the purpose of partially blocking their pores and, in this way, make cracking medium-distillate range molecules difficult, which preferably occurs at low reaction temperatures. But, in spite of this, the remaining sites continue to be quite active, sufficiently so as to be able to crack smaller molecules, in the gasoline range, guaranteeing an overall increase in light olefins, which allows the use of the additive in FCC processing, in industrial operations that seek to maximize the production of medium-distillates.

Alternatively, the new additive may be obtained by modifying any commercial ZSM-5 zeolite additive. In this case, in order to precipitate the rare earths, it is necessary to perform a pre-treatment to avoid the interaction between the phosphate present in these additives and the rare earths. Said new additive is prepared from an precursor additive, in the form of microspheres. Next, the precursor additive is modified to acquire the desired characteristics.

The precursor additive is prepared by adding a mixture of the following components: 1) a peptized alumina through treatment with nitric acid; 2) a clay; 3) commercial colloidal silica or synthesized silica; 4) a ZSM-5 zeolite; 5) phosphoric acid. After the addition phase of the mixture, drying takes place through a suspension of the components in a spray dryer in such a way that the product acquires an adequate particle size and is in a micro-sphere form. Then said new additive is produced from this precursor additive or from a commercial additive through the following stages: 1) washing or calcination of the precursor additive or the commercial additive. This washing or thermal pretreatment is of fundamental importance in order to avoid the interaction between the phosphate and the rare earths that will be introduced afterwards. For the washing, 900 g of hot water should be mixed to each 100 g of ZSM-5. The mixture should be kept at 100° C., for one hour. For calcination, maintain the precursor additive or commercial additive at 600° C. for one hour; 2) dilution with water of a calculated quantity of a chloride rare earth solution ($RECl_3$), at 22% concentration (p/p in terms of $RE_2O_3$), up to a total volume of 50 ml and add this solution to each 100 g of pretreated ZSM-5; 3) add $NH_4OH$ concentrate to adjust the pH to a value above 7.0 and, preferably within the range of between 8 and 10. The pH increase makes the rare earths precipitate ions while the sites on the zeolite remain unchanged; 4) wash product twice using 200 g of water for each 100 g of ZSM-5 to accomplish this washing; 5) dry the new additive at 120° C. for a minimum of 10 hours.

EXAMPLE

Tests in an ACE unit (a laboratory scale FCC unit) were performed for comparison between the commercial additive, K2000, specific for maximizing olefins, and the new additive $RE_2O_3$ 6C, containing 6% p/p of the rare earth precipitated into the zeolite (Table 1). The results of the different additives were compared in terms of yield and aromaticity of the products. A precursor additive of $RE_2O_3$ 6C is prepared, following the well known state of the art method, by adding the mixture of: 1) a peptized alumina through treatment with nitric acid; 2) a clay; 3) commercial colloidal silica or synthesized silica; 4) a ZSM-5 zeolite; 5) phosphoric acid. After the addition phase of the mixture, dry with a spray dryer in such a way that the additive acquires the typical particle size and a microsphere format. Treat the precursor additive as necessary to avoid the interaction between the phosphate present in the additive and the rare earths. In this example, the pretreatment adopted was calcination of the sample at 600° C. for one hour.

For precipitation of the rare earths, an appropriate amount of the rare earth chloride solution diluted with deionized water is added to the precursor additive, dripping the solution on to same. The pH of the paste that results from the mixture is corrected to a value of 8.5 by adding sodium hydroxide. The additives to be evaluated are deactivated hydrothermically, in a laboratory fixed bed unit, with steam at 800° C., for 5 hours. After deactivation, the additives are mixed into an equilibrium catalyst that comes from one of the PETROBRAS refineries in the proportion of 4% p/p of the additive to 96% p/p of the catalyst.

The additives mixed into the catalyst are tested in an ACE unit, in accordance with the protocol of this unit's test pattern.

The reaction temperature adopted was 500° C. to simulate a low severity operation and different ratios between the catalyst and oil were established, by adjusting the injection time of the sample.

The load used was heavy vacuum gas oil the properties of which are found in Table 2. The results obtained are in Table 3.

By comparing the profile of yields and the level of saturated hydrocarbons obtained by the catalyst without additive and the mixture of 4% of commercial additive K2000 with 96% of the catalyst itself, the effect of the K2000 on the yield and the quality of the LCO is clearly verified, that is to say, a reduction in the yield of LCO and saturated hydrocarbons is observed. However, by using the modified additive from the method presented by this invention, it is observed that the effect is mitigated and the cracking of LCO is minimized. Conversely the desired increase in the yield of LPG and propene is achieved.

TABLE 1

ADDITIVES TESTED.

| Additive | Pre-treatment | $RE_2O_3$ (% p/p) |
|---|---|---|
| K2000 BR | None | 0 |
| $RE_2O_3$ 6C | Calcinated at 600° C., 1 h | 6 |

TABLE 2

LOAD PROPERTIES.
Properties of Heavy Gas Oil

| | | | |
|---|---|---|---|
| Density (g/cm³) | 0.9377 | Saturated HPLC/SFC (% p) | 50.3 |
| RCR (% p/p) ASTM 524 | 0.43 | Mono-aromatic HPLC/SFC (% p) | 18.8 |
| Basic nitrogen (ppm) | 1204 | Di-aromatic HPLC/SFC (% p) | 19.5 |
| Sulfur (%) ASTM 2622 | 0.68 | Tri-aromatic HPLC/SFC (% p) | 7.8 |
| Aniline Point (° C.) ASTM 6 11 | 76.2 | Polychromatic HPLC/SFC (% p) | 3.5 |

TABLE 3

RESULTS

| | CATALYST | | |
|---|---|---|---|
| | (ECAT) 100% Catalyst A | 4% K2000 BR 96% Catalyst A | 4% $RE_2O_3$ 6C 96% Catalyst A |
| Conversion (% p/p) | 46 | 46 | 46 |
| Kc | 0.852 | 0.852 | 0.852 |
| CTO (p/p) | 4.756 | 4.609 | 4.894 |
| Delta coke (% p/p) | 1.521 | 1.617 | 1.453 |
| Yield (% p/p) | | | |
| Coke | 7.24 | 7.45 | 7.11 |
| Combustible gas | 1.57 | 1.38 | 1.67 |
| Propene | 2.428 | 3.591 | 4.015 |
| LPG | 7.52 | 9.64 | 10.58 |
| Gasoline | 29.67 | 27.53 | 26.64 |
| LCO | 23.42 | 22.96 | 23.13 |
| Decanted oil | 30.58 | 31.04 | 30.87 |
| Saturated hydrocarbons | 48.9 | 46 | 48.2 |

The invention claimed is:

1. Process for the production and modification of catalyst additives for fluid catalytic cracking (FCC) whereby LCO range molecule cracking is minimized and saturates in medium distillates are maximized and suitable for use in low severity operations, the process comprising the steps of:
   i) providing a precursor additive comprising a ZSM-5 zeolite;
   ii) washing or thermally pretreating the precursor additive, wherein the washing or thermally pretreating inhibits interaction between phosphate and rare earths in step iii), thereby producing a modified additive; and
   iii) depositing rare earths on a surface of the modified additive.

2. Process in accordance with claim 1, wherein said precursor additive is made of nitric acid peptized aluminum, commercial colloidal silica or synthesized silica, ZSM-5 zeolite and phosphoric acid.

3. Process in accordance with claim 1, wherein said precursor additive is produced by drying in a spray dryer, in order to acquire the form of micro-spheres and the correct properties.

4. Process in accordance with claim 1, wherein the precursor additive is washed with water.

5. Process in accordance with claim 4, wherein said water is hot water at a temperature of 100° C.

6. Process in accordance with claim 1, wherein thermally pretreating comprises calcination.

7. Process in accordance with claim 6, wherein said calcination is performed within the range between 450° C. and 650° C. from one half hour up to 5 hours.

8. Process in accordance with claim 1, wherein the deposit of rare earths are performed by the addition of a rare earth source on a modified additive with a pH of 8.5.

9. Process in accordance with claim 8, wherein the addition of a rare earth source on a modified additive comprises the addition of a chloride rare earth solution ($RECl_3$) on a modified additive and concentrated solution of ammonium hydroxide ($NH_4OH$) to maintain the pH above 7.0.

10. Process in accordance with claim 8, wherein the pH is maintained within the range of between 8.0 and 10.

* * * * *